(12) United States Patent
Sparrell et al.

(10) Patent No.: US 6,970,448 B1
(45) Date of Patent: Nov. 29, 2005

(54) WIRELESS TDMA SYSTEM AND METHOD FOR NETWORK COMMUNICATIONS

(75) Inventors: Carlton Sparrell, Palo Alto, CA (US); Roberto Aiello, Palo Alto, CA (US); Gerald Rogerson, Morgan Hill, CA (US); Minnie Ho, Palo Alto, CA (US)

(73) Assignee: Pulse-LINK, Inc., Carlsbad, CA (US)

( * ) Notice: Subject to any disclaimer, the term of this patent is extended or adjusted under 35 U.S.C. 154(b) by 726 days.

(21) Appl. No.: 09/603,310

(22) Filed: Jun. 21, 2000

(51) Int. Cl.⁷ ............................................. H04B 7/212
(52) U.S. Cl. ..................................... 370/347; 370/321
(58) Field of Search ................................ 370/277, 279, 370/282, 294, 310.1, 310.2, 314, 321, 347, 370/350, 348, 442, 468, 471, 473, 509, 231, 370/337, 472, 310, 336

(56) References Cited

U.S. PATENT DOCUMENTS

| | | |
|---|---|---|
| 3,668,639 A | 6/1972 | Harmuth |
| 3,678,204 A | 7/1972 | Harmuth |
| 3,728,632 A | 4/1973 | Ross |
| 3,875,524 A | 4/1975 | Harzer et al. |
| 4,201,892 A | 5/1980 | Schmidt ..................... 370/104 |
| 4,232,339 A | 11/1980 | Smiley et al. |
| 4,506,267 A | 3/1985 | Harmuth |
| 4,574,378 A | 3/1986 | Kobayashi |
| 4,586,177 A | 4/1986 | Kaul .......................... 370/104 |
| 4,641,317 A | 2/1987 | Fullerton |
| 4,644,534 A | 2/1987 | Sperlich |
| 4,651,152 A | 3/1987 | Harmuth |
| 4,672,608 A | 6/1987 | Ball et al. |
| 4,743,906 A | 5/1988 | Fullerton |
| 4,763,325 A * | 8/1988 | Wolfe et al. ................. 370/322 |
| 4,813,057 A | 3/1989 | Fullerton |
| 5,134,408 A | 7/1992 | Harmuth |

(Continued)

FOREIGN PATENT DOCUMENTS

WO    WO 01/93434 A2    10/2001

(Continued)

OTHER PUBLICATIONS

A Time-Division Multiple-Access System for the Defense Statellite Communications System, Husted, et al., 1970 EASCON, pp. 229-237.

(Continued)

*Primary Examiner*—Duc Ho
*Assistant Examiner*—Thien D. Tran
(74) *Attorney, Agent, or Firm*—Pulse-LINK, Inc.; Peter R Martinez; Steve A Moore

(57) ABSTRACT

The present invention describes a network communication system which includes a first slave transceiver configured to communicate a plurality of TDMA data packets at different data rates to a second slave transceiver. The second slave transceiver is also configured to communicate a plurality of TDMA data packets at different data rates to the first slave transceiver. A master transceiver manages data communications between the first slave transceiver and the second slave transceiver. Each transceiver includes a data modulation unit, a transmitter, an antenna, and a receiver. The data modulation unit is configured to generate a plurality of signals having variable pulse repetition frequencies and different modulation techniques. The transmitter is coupled to the data modulation unit and the transmitter is configured to generate a pulse stream according to the data modulation unit. The transmitting antenna is coupled to the transmitter and the transmitting antenna is configured to transmit a plurality of ultra wide band base band signals. The receiver is configured to detect and demodulate said ultra wide band base band signals operating at variable pulse repetition frequencies and having different modulation methods.

8 Claims, 9 Drawing Sheets

U.S. PATENT DOCUMENTS

| | | | |
|---|---|---|---|
| 5,148,174 A | 9/1992 | Harmuth | |
| 5,153,595 A | 10/1992 | Harmuth | |
| 5,159,343 A | 10/1992 | Harmuth | |
| 5,307,081 A | 4/1994 | Harmuth | |
| 5,334,975 A | 8/1994 | Wachob et al. | |
| 5,365,240 A | 11/1994 | Harmuth | |
| 5,493,691 A | 2/1996 | Barrett | |
| 5,519,400 A | 5/1996 | McEwan | |
| 5,523,758 A | 6/1996 | Harmuth | |
| 5,537,414 A | 7/1996 | Takiyasu et al. | |
| 5,586,145 A | 12/1996 | Morgan et al. | |
| 5,592,177 A | 1/1997 | Barrett | |
| 5,594,738 A | 1/1997 | Crisler et al. | |
| 5,610,907 A | 3/1997 | Barrett | |
| 5,644,576 A | 7/1997 | Bauchot et al. | |
| 5,675,388 A | 10/1997 | Cooper | |
| 5,677,927 A | 10/1997 | Fullerton et al. | |
| 5,687,169 A | 11/1997 | Fullerton | |
| 5,715,236 A | 2/1998 | Gilhousen et al. | |
| 5,748,891 A | 5/1998 | Fleming et al. | |
| 5,761,197 A * | 6/1998 | Takefman | 370/337 |
| 5,812,671 A | 9/1998 | Ross | |
| 5,850,422 A | 12/1998 | Chen | |
| 5,886,652 A * | 3/1999 | Adachi et al. | 341/67 |
| 5,889,767 A * | 3/1999 | Kimura | 370/314 |
| 5,903,605 A | 5/1999 | Crittenden | |
| 5,909,491 A | 6/1999 | Luo | |
| 5,920,278 A | 7/1999 | Tyler et al. | |
| 5,940,435 A | 8/1999 | Hendrickson | |
| 6,002,708 A | 12/1999 | Fleming et al. | |
| 6,026,125 A | 2/2000 | Larrick, Jr. et al. | |
| 6,041,051 A | 3/2000 | Doshi et al. | |
| 6,055,411 A | 4/2000 | Ishida et al. | |
| 6,064,697 A | 5/2000 | Yoshikawa | |
| 6,067,648 A | 5/2000 | Hunter et al. | |
| 6,069,887 A | 5/2000 | Geiger et al. | |
| 6,097,707 A | 8/2000 | Hodzic et al. | |
| 6,097,766 A | 8/2000 | Okubo et al. | |
| 6,115,390 A | 9/2000 | Chuah | |
| 6,122,291 A | 9/2000 | Robinson et al. | |
| 6,133,876 A | 10/2000 | Fullerton et al. | |
| 6,161,138 A * | 12/2000 | Gross et al. | 709/225 |
| 6,172,965 B1 * | 1/2001 | Edwards et al. | 370/250 |
| 6,178,217 B1 | 1/2001 | Defries et al. | |
| 6,181,687 B1 | 1/2001 | Bisdikian | |
| 6,212,230 B1 | 4/2001 | Rybicki et al. | |
| 6,232,910 B1 | 5/2001 | Bell et al. | |
| 6,236,662 B1 | 5/2001 | Reilly | |
| 6,239,741 B1 | 5/2001 | Fontana et al. | |
| 6,246,377 B1 | 6/2001 | Aiello et al. | |
| 6,275,500 B1 | 8/2001 | Callaway et al. | |
| 6,275,544 B1 | 8/2001 | Aiello et al. | |
| 6,285,873 B1 | 9/2001 | Quick, Jr. | |
| 6,292,153 B1 | 9/2001 | Aiello et al. | |
| 6,300,903 B1 | 10/2001 | Richards et al. | |
| 6,310,865 B1 | 10/2001 | Ohki | |
| 6,324,397 B1 | 11/2001 | Adachi et al. | |
| 6,347,084 B1 | 2/2002 | Hulyalkar et al. | |
| 6,351,468 B1 | 2/2002 | LaRowe et al. | |
| 6,351,652 B1 | 2/2002 | Finn et al. | |
| 6,385,461 B1 | 5/2002 | Raith | |
| 6,400,308 B1 | 6/2002 | Bell et al. | |
| 6,424,645 B1 | 7/2002 | Kawabata et al. | |
| 6,437,832 B1 | 8/2002 | Grabb et al. | |
| 6,449,265 B1 | 9/2002 | Prieto, Jr. | |
| 6,463,042 B1 | 10/2002 | Paatelma | |
| 6,477,171 B1 | 11/2002 | Wakeley et al. | |
| 6,480,505 B1 | 11/2002 | Johansson et al. | |
| 6,492,904 B2 | 12/2002 | Richards | |
| 6,497,656 B1 | 12/2002 | Evans et al. | |
| 6,505,032 B1 | 1/2003 | McCorkle et al. | |
| 6,510,150 B1 | 1/2003 | Ngo | |
| 6,519,460 B1 | 2/2003 | Haartsen | |
| 6,539,213 B1 | 3/2003 | Richards et al. | |
| 6,549,567 B1 | 4/2003 | Fullerton | |
| 6,574,266 B1 | 6/2003 | Haartsen | |
| 6,597,683 B1 | 7/2003 | Gehring et al. | |
| 6,603,818 B1 | 8/2003 | Dress et al. | |
| 6,621,857 B1 | 9/2003 | Belotserkovsky et al. | |
| 6,625,229 B2 | 9/2003 | Dress et al. | |
| 6,628,642 B1 | 9/2003 | Mile'n et al. | |
| 6,633,558 B1 | 10/2003 | Cho et al. | |
| 6,668,008 B1 * | 12/2003 | Panasik | 375/139 |
| 6,697,382 B1 | 2/2004 | Eatherton | |
| 6,707,828 B1 | 3/2004 | Wolf | |
| 6,735,238 B1 | 5/2004 | McCorkle et al. | |
| 6,735,734 B1 | 5/2004 | Liebetreu et al. | |
| 6,747,959 B1 | 6/2004 | Ho | |
| 2001/0055353 A1 | 12/2001 | Rybicki et al. | |
| 2002/0018458 A1 | 2/2002 | Aiello et al. | |
| 2002/0131370 A1 | 9/2002 | Chuah et al. | |
| 2003/0054764 A1 | 3/2003 | McCorkle et al. | |

FOREIGN PATENT DOCUMENTS

| | | |
|---|---|---|
| WO | WO 02/31986 A2 | 4/2002 |

OTHER PUBLICATIONS

"802.1D and 802.1Q Bridging Conformance" TA Document IEEE802.17-11Jul2001/040:3, 1394 Trade Association, 7 pages, Oct. 2001.

Brunoi Pattan, A Brief Exposure to Ultra-Wideband Signaling, Microwave Journal, Dec. 2003, 5 pages.

David G. Leeper, Wireless Data Blaster, Scientific American, May 2002, pp. 65-69.

Dr. James P. K. Gilb, Wireless Multimedia . . . A Guide to the IEEE 802.15.3 Standard, Mar. 2004, 14 pages.

Aether Wire & Location, Inc., Robert Fleming et al., "Integrated, Low-Power, Ultra-Wideband Tranceivers for Distributed Position Location and Communication," Technical Abstracts of Proposal to Defense Advanced Research Projects Agency (DARPA), Part I—Technical Proposal, 1998, pp. 1-52.

Aether Wire & Location, Inc., Robert Fleming et al., "Low-Power, Miniature, Distributed Position Location and Communication Devices Using Ultra-Wideband, Nonsinusoidal Communication Technology," Semi-Annual Technical Report Prepared for: ARPA/FBI, Jul. 1995, pp. 1-40.

Henning F. Harmuth, "Fundamental Limits for Radio Signals With Large Bandwidth," IEEE Transactions on Electromagnetic Compatibility, vol. EMC-23, No. 1, Feb. 1981, pp. 37-43.

Henning F. Harmuth, "Frequency-Sharing and Spread-Spectrum Transmission with Large Relative Bandwidth," IEEE Transactions on Electromagnetic Compatibility, vol. EMC-20, No. 1, Feb. 1978, pp. 232-239.

Henning F. Harmuth, "Applications of Walsh functions in communications," IEEE Spectrum, Nov. 1969, pp. 82-91.

Henning F. Harmuth et al., "Large-Current, Short-Length Radiator for Nonsinusoidal Waves," IEEE International Symposium on Electromagnetic Compatibility, 1983, pp. 453-456.

* cited by examiner

WIRELESS TDMA SYSTEM AND METHOD FOR NETWORK COMMUNICATIONS

BACKGROUND OF THE INVENTION

1. Field of the Invention

The present invention relates to wireless network communications. More particularly, the present invention relates to a Time Division Multiple Access (TDMA) system and method.

2. The Background Art

Time Division Multiple Access (TDMA) is well known in the art as a method of utilizing bandwidth across a shared medium. The basic principle of time division multiplexing is that it permits a user to have access to a TDMA system which operates at a rate which is several times greater that the rate required to support the user's own data throughput.

Several common wireless protocols employ TDMA, such as the Global Mobile System (GSM), Digital Enhanced Cordless Telecommunications (DECT), and Bluetooth. GSM is a European standard which employs simultaneous TDMA and Frequency Division Multiple Access (FDMA) schemes in which each frequency used for communication is divided into TDMA slots. With GSM each TDMA device is assigned slots for transmit, receive and base station communications. All GSM communications in the system take place using the Gaussian Minimum Shift Keying (GMSK) modulation technique.

DECT is a standard developed by the European Telecommunication Standard Institute for use in European digital mobile telephone systems. DECT uses frames of 24 slots allowing up to 12 channels for transmit and 12 channels for receive. Each device on the DECT network uses the same modulation technique, but the system allocates varying bandwidth to devices by assigning multiple slots or through the use of padding to stretch packets to uniform lengths.

Bluetooth is a technology specification for small form factor, low-cost, short range radio links between mobile PCs, mobile phones and other portable devices. Additionally, Bluetooth is an emerging standard for consumer wireless devices which uses TDMA. Under this standard, devices can be assigned one or more 625 $\mu$s time slots in which to transmit or receive. Each device uses the same modulation technique. Different bandwidth devices are accommodated by assigning multiple contiguous timeslots to devices with increased throughput requirements.

For each of the wireless protocols described above, a common modulation scheme is employed by all devices on the network. Additionally, a common wireless medium is allocated to devices with different bandwidth requirements to share the same network. Furthermore, in each of the previously described protocols, increased bandwidth demands for high bit-rate devices are satisfied by assigning longer time slots to the high bandwidth device. Low bit-rate devices are accommodated by allowing them to zero-fill assigned slots up to the minimum slot length supported.

Therefore, it would be beneficial to allow devices with different bit-rates to communicate with one another. Previous systems have been employed where a TDMA scheme allows different devices to be assigned different time slots at different bit-rates.

U.S. Pat. No. 4,201,892 ('892) titled "Multi-Rate TDMA Communication System" is one system developed for satellite communications in which two different bit-rates are supported in the same TDMA frame using two different frame reference bursts. At the beginning of each frame, the primary frame reference burst is transmitted followed by one or more time-slots assigned to devices capable of communicating using the primary bit-rate. After the primary bit-rate slots, a device synchronized to the primary frame reference burst transmits a secondary frame reference burst at a secondary bit-rate. Devices capable of transmitting at the secondary bit-rate are then allowed to transmit slots following the secondary frame reference burst. The system is configured so that the secondary slots are completed before the next primary frame reference which begins the following frame.

This system and method of interleaving two or more classes of different bit-rate devices has limited application for a variety of reasons. For example, the system requires multiple frame reference bursts and divides the frame into separate sections isolated by these frame reference bursts. It would therefore be beneficial to provide a system that does not require multiple frame reference bursts and allows devices of varying bit-rates to be assigned slots at any point within the frame. By allowing devices to be assigned slots anywhere within the frame, there is greater flexibility when devices of different bandwidths are continuously signing one and off from the network.

U.S. Pat. No. 4,586,177 ('177) titled "Integrated Narrowband and Wideband TDMA Networks" is another teaching which allows different devices to be assigned different time slots at different bit-rates. Like the '892 patent, the network system provides that different reference bursts are used to divide the frame into sub-frames supporting devices of differing bit rates. However, unlike the '892 patent, the system disclosed in the '177 patent divides the frame to support two types of devices. The system supports wideband devices which are assigned the complete bandwidth during TDMA slots as well as narrowband devices which share the bandwidth during TDMA slots using a FDMA technique.

However, the network system disclosed in the '177 patent is limited to the use of multiple frame reference bursts. Additionally, the patent is limited to devices having specific bit-rates beings assigned slots following their respective reference bursts. Further still, each of these bursts are transmitted at a different carrier frequencies.

Another system in the prior art is described in "A Time Division Multiple Access System for the Defense Satellite Communication System" by Husted and Walker, appearing in the reports of the 1970 EASCON, pages 229–237. This system uses an external timing source for framing information and does not use a frame reference burst.

The limitation of Husted et al.'s TDMA Sattellite Communication System is that any device participating in this system must be capable of demodulating the highest bit rate signal. Therefore, the low bit-rate devices must include all electronics and timing necessary to receive at the higher bit-rate and prevents low-cost, low bit-rate devices from being developed.

Therefore, it would be beneficial to provide a network which would allow low bit rate devices to communicate with high bit rate devices.

It would also be beneficial to provide a system and method for devices operating with different modulation methods to communicate with one another.

Further still it would be beneficial to provide a system and method wherein a master device synchronizes the communications between slave devices, and the communications may be accomplished by varying the pulse repetition frequency, the modulation technique, the TDMA frame slot size, and the number of slots in a TDMA frame.

SUMMARY OF THE INVENTION

The present invention describes a network communication system which includes a first slave transceiver configured to communicate a plurality of Time Division Multiple Access (TDMA) data packets at different data rates to a second slave transceiver. The second slave transceiver is also configured to communicate a plurality of TDMA data packets at different data rates to the first slave transceiver. A master transceiver manages data communications between the first slave transceiver and the second slave transceiver.

Each transceiver includes a data modulation unit, a transmitter unit, an antenna, and a receiver. The data modulation unit is configured to generate a plurality of signals having variable pulse repetition frequencies and different modulation techniques. The transmitter unit is coupled to the data modulation unit and the transmitter unit is configured to generate a pulse stream according to the data modulation unit. The transmitting antenna is coupled to the transmitter unit and the transmitting antenna is configured to transmit a plurality of ultra wide band base band signals. The receiver is configured to detect and demodulate the ultra wide band base band signals operating at variable pulse repetition frequencies and having different modulation methods.

The present invention provides a system and method for low bit-rate devices to communicate with high bit-rate devices. The present invention also provides a system and method for devices operating with different modulation techniques to communicate with one another. The present system and method provides a TDMA system and method that allows sharing a wireless medium with devices capable of transmitting and receiving at different data rates. The system and method are particularly applicable to base band spread spectrum networks, also referred to herein as ultra-wide band networks.

The system of the preferred embodiment comprises a network of transceiver node devices. Each transceiver transmits and receives data. In the preferred embodiment, the invention provides data transmission with base band wireless technology which is also referred to as ultra wide band technology. In the preferred embodiment there is no carrier signal to add or remove and signal processing may be accomplished with the base band frequencies.

In operation, the master transceiver maintains a master clock which runs at a multiple of the data transmission bit rate. The slave transceivers have local clocks which also run at a multiple of the data transmission bit rate and are synchronized to the master clock. The master transceiver manages data transmissions between the slave node device of the networked system.

BRIEF DESCRIPTION OF THE DRAWINGS

FIG. 4a is a block diagram of a transmitter that may be used in the present invention.

FIG. 4b is a block diagram of a drive system of FIG. 4a.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

The present invention provides a Time Division Multiple Access (TDMA) system and method that allows sharing a wireless medium which can identify and operate in a variable bit rate environment. The present invention provides a system and method capable of supporting devices with vastly different bandwidth requirements. Some devices, such as television receivers, require high bandwidth data communication. The higher cost associated with a television receiver allows for the design of a television having high data rate modulation techniques. Other devices such as home thermostats have lower bandwidth requirements and require simpler modulation techniques for lower cost connectivity.

The present invention operates within a network which allows devices to operate at different bit rates and employ different modulation techniques and permits sharing of the same wireless medium. Additionally, the transceivers of the present invention are capable of negotiating links between one another which are dependent on environmental characteristics such as noise and reflection. Further still the present invention allows backward compatibility to be designed into the network so that newer devices communicate with older devices. The system preferably works in a base band or ultra wide band environment. However, the system and method may operate in other environments which use carrier signals.

Figure 1:
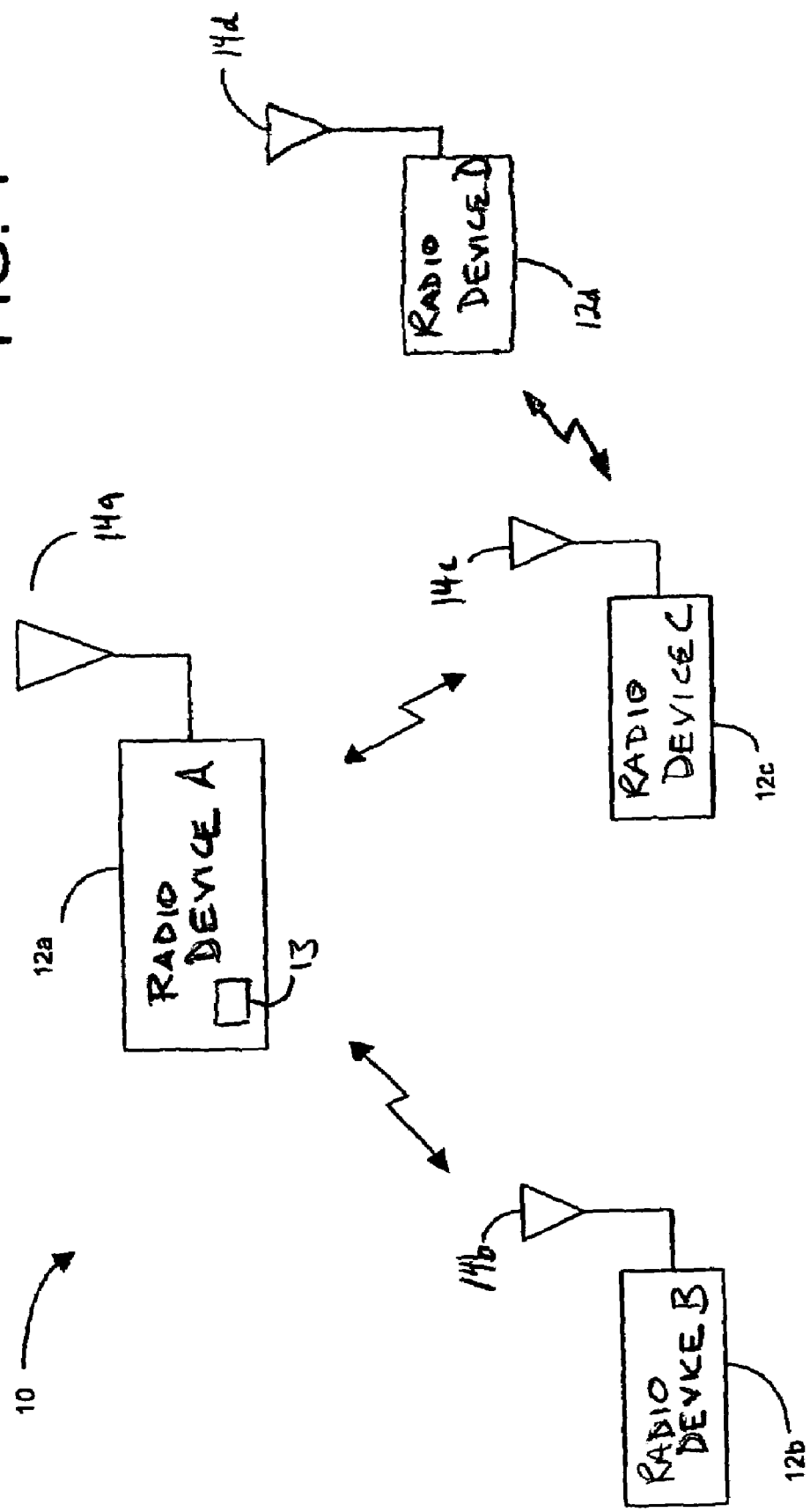
FIG. 1 is a block diagram of a wireless network system having a plurality of mobile transceiver devices.

The TDMA system and method of the present invention will be more fully understood by first referring to FIG. 1, which shows a wireless network system 10 comprising a plurality of mobile transceiver devices 12a–12d, also identified as radio devices A–D, wherein each transceiver has a corresponding antenna 14a–14c. One device 12a is acting as a "master" transceiver or device, while the remaining devices 12b, 12c and 12d act as "slave" transceivers or devices. It shall be appreciated by those skilled in the art that the terms transceiver and devices may be used interchangeably. The particular transceiver node 12a–12d which acts as the master device may change depending upon the manner in which the network system 10 is used, and thus the components and hardware for each transceiver 12a–12d are generally the same.

By way of example and not of limitation, the illustrative example of four transceiver devices 12a–12d are shown in network system 10. The master transceiver 12a carries out the operation of managing network communications between transceivers 12b–12d by synchronizing the communications between the transceivers. Therefore, the master transceiver 12a maintains communication with slave transceivers 12b through 12d. Additionally, the slave transceivers are able to communicate amongst themselves, as illustrated by the typical communications between slave transceiver 12c and 12d. The systems and methods for communications are described in further detail below.

The present invention provides that the master transceiver need not include dedicated communication hardware to provide simultaneous open links between itself and all the slave devices. However, the master device must maintain communications with the slave devices so that all devices on the network are properly synchronized. The present design guarantees that media can be broadcast to many nodes at the same time. It shall be appreciated by those skilled in the art and having the benefit of this disclosure, that the network system 10 may comprise a larger number of transceiver devices, with the actual number of transceiver devices in network system 10 varying depending on the particular application for the system 10.

Figure 2:
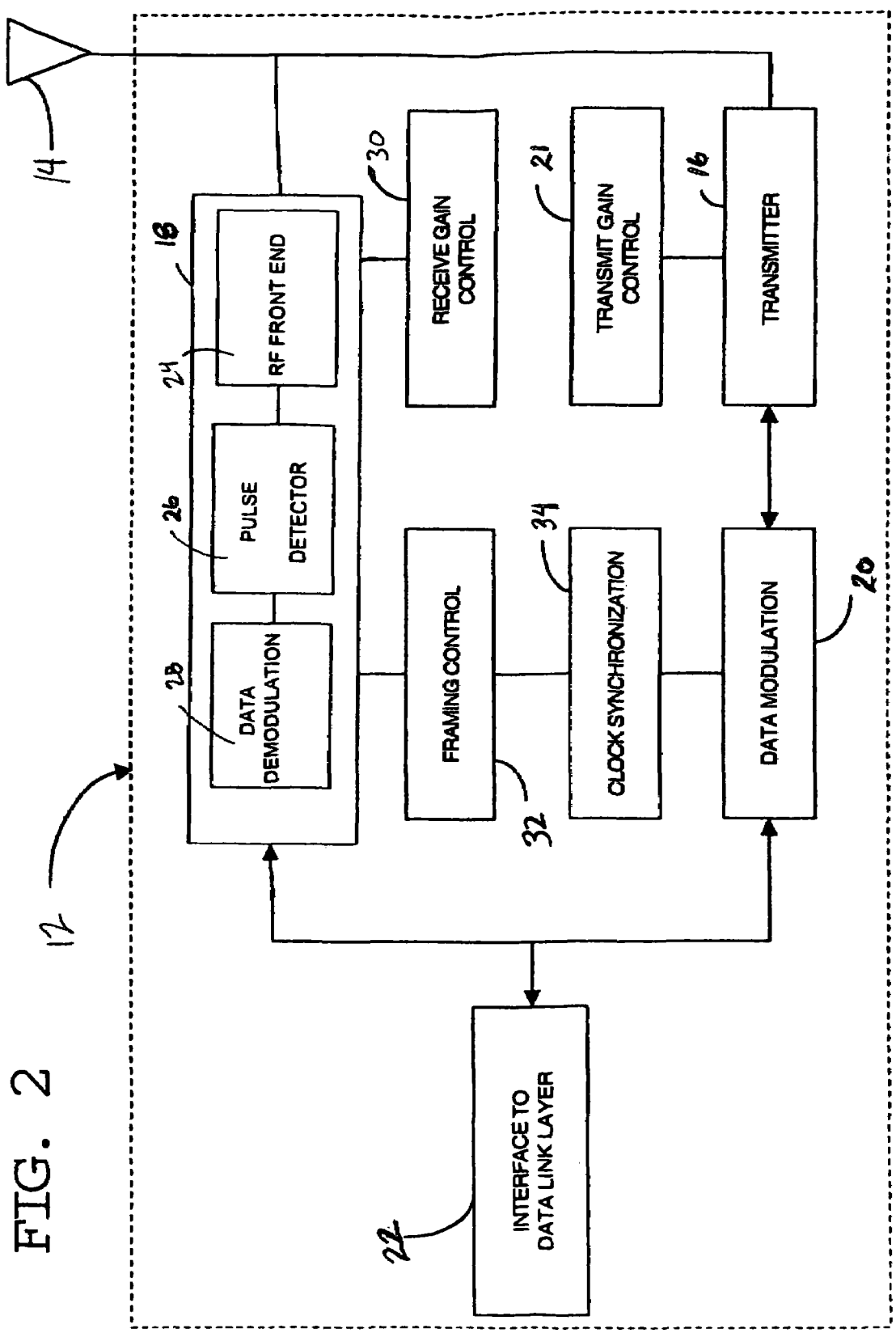
FIG. 2 is a functional block diagram of the physical layer according to an illustrative embodiment of the present invention.

Referring now to FIG. 2 as well as FIG. 1, a functional block diagram of the "Physical layer" implementation of a transceiver node device 12 in accordance with the present invention is shown. The "Physical layer" as described herein refers to the Physical layer according to the Open Systems Interconnection (OSI) Reference Model.

Each transceiver node device 12a–12d is structured and configured as transceiver device 12 of FIG. 2. The transceiver node device 12 comprises an integrated circuit or like hardware device providing the functions described below. Transceiver device 12 comprises an antenna 14 coupled to a transmitter 16 and a receiver 18. The transmitter 16 is connected to a data modulation unit 20. Transmitter gain control 21 is coupled to transmitter 16. Both the transmitter 16 and the data modulation unit 20 are coupled to an interface to Data Link Layer (DLL) 22. The receiver 18 coupled to the antenna 14 comprises generally an RF front end section 24, a pulse detector 26, a data demodulation or data recovery unit 28. A receiver gain control 30 is included in association with receiver 18.

A framing control unit 32 and a clock synchronization unit 34 are operatively coupled to the receiver 18 and the data modulation unit 20 associated with the transmitter 16. Transmitter 16 and receiver 18 are operatively coupled to antenna 14, preferably through a RF switch (not shown).

Data Link Layer interface 22 comprises circuitry which provides an interface or higher communication exchange layer between the Physical Layer of network 10, as embodied in transceiver 12, and the "higher" layers according to the OSI reference model. The layer immediately "above" the Physical Layer is the Data Link Layer. Output information from the Data Link Layer is communicated to data modulation unit 20 via interface 22. Input data from receiver 18 is communicated to the Data Link Layer via interface 22.

The data modulation unit 20 comprises circuitry which converts information received from interface 22 into an output stream of pulses. Various forms of pulse modulation may be employed by data modulator 20. One modulation scheme which may be used is on-off keying wherein the presence and absence of pulses respectively represent the "ones" and "zeros" for digital information. In this situation, data modulation unit 20 causes a pulse to be generated at the appropriate bit time to represent a "one", or causes the absence of a pulse to represent a "zero". In another embodiment, pulse amplitude modulation is employed wherein the amplitude of a pulse represents a digital value. The number of bits represented by a pulse depends on the dynamic range and signal-to-noise ratio available. The data modulation method is described in further detail below.

The pulse stream generated by data modulator 20 and transmitted by transmitter 16 is synchronized with a master clock associated with the clock synchronization function 34, and is sent in an appropriate time slot according to a frame definition provided by the framing control unit 32, as described further below. In order to maintain a synchronized network, one device must serve the function of being a clock master and maintaining the master clock for the network 10.

Transmitter 16 is preferably a wide band transmitter device which generates a pulse stream according to output from data modulation unit 20 and which transmits the pulse stream via antenna 14 as a stream of electromagnetic radio frequency (RF) pulses. In the preferred embodiment, data is transmitted via impulses having 100 picosecond risetime and 200 picosecond width, which corresponds to a bandwidth of between about 2.5 GHz and 5 GHz. The transmitter gain control 21 preferably comprises a power control circuit.

Antenna 14 comprises a radio-frequency (RF) transducer and is structured and configured for both transmission and reception. During reception, antenna 14 converts RF pulses into corresponding voltage signals. During transmission antenna 14 converts an electric current containing pulse information into corresponding baseband ultra wide band RF pulses. In one preferred embodiment, antenna 14 is structured and configured as a ground plane antenna having an edge with a notch or cutout portion operating at a broad spectrum frequency at about 3.75 GHz. The structure and configuration of antenna 14 may vary in order to accommodate various frequency spectrum ranges. Antenna 14 may alternatively comprise a "dual antenna" configuration wherein transmission and reception occur from different portions or regions of antenna 14.

Clock synchronization unit 34 includes a clock function (not shown) which maintains a clock or timing device (also not shown). The clock is preferably a conventional voltage controlled oscillating crystal device which operates at a multiple of the bit rate for the system 10. In the case of the master transceiver 12a, the clock in the clock synchronization unit serves as a master clock for network 10. As noted above, each transceiver node 12a–12d may act as the master device for the network. A clock recovery function, described further below, is included with receiver 18 wherein timing information from the master clock is recovered.

Framing control unit 32 comprises hardware and/or circuitry which carries out the operations of generating and maintaining time frame information with respect to transmitted data. Framing control unit 32 is utilized by the transceiver node which is acting as the master transceiver by dividing up the transmitted pulse information into "frames". Data transmission between the several node devices 12a–12d is preferably carried out via a Medium Access Control protocol utilizing a Time Division Multiple Access (TDMA) frame definition.

Subject to the TDMA frame definition, data is transmitted as short RF pulses and is divided into discrete data frames, wherein each data frame is further subdivided into "slots". The frame definition is provided to transceivers 12a–12d from the Data Link Layer via interface 22. The TDMA frame definition is defined by Medium Access Control (MAC) sublayer software associated with the Data Link Layer. Framing control unit 32 in master transceiver device 12a generates and maintains time frame information through use of a slot having a "Start-Of-Frame" (SOF) symbols, which are used by the slave transceivers 12b–12d to identify the frames in the incoming data stream.

In the most general terms, the preferred receiver 18 includes a RF front end module 24, pulse detection unit 26, and a data demodulation unit 28. The receiver 18 detects modulated ultra wide band base band pulses generated by the transmitter. The receiver apparatus comprises a RF front end section 28, a pulse detection unit 26, and data recovery unit 24. A more detailed description of the preferred receiver of the present invention is provided below.

Transceiver 12 further includes circuitry for controlling the gain of signals received and transmitted and shown as gain control units 30 and 21, respectively. The transmit gain control unit 21 carries out the operation of controlling the power output of the transmitter 12 and receive gain control unit 30 carries out the operation of controlling the input gain of the receiver 18. The optimized gain for each control unit is dependent on maximizing the power demands for transceiver communications while minimizing the energy consumption of each control unit.

As described in further detail below, the physical layer of the system 10 includes a transmitter 16 and a data modulation unit 20, which is configured to generate a plurality of signals having a variable pulse repetition frequencies and different modulation techniques. The signals generated by the data modulation unit 20 are coupled to a transmitter 16, in which the transmitter 16 generates a pulse stream according to the data modulation unit 20. The antenna 14 which acts as a transmitting antenna and a receiving antenna is coupled to the transmitter 16. The antenna 14 generates a plurality of ultra wide band base band signals. Additionally, the antenna 14 is capable of receiving ultra wide band base band signals. A receiver 18 coupled to the antenna is configured to detect and demodulate the ultra wide band base band signals. Additionally, the receiver 18 is capable of detecting the variable pulse repetition frequency and different modulation techniques generated by the transmitter 16.

Figure 3:
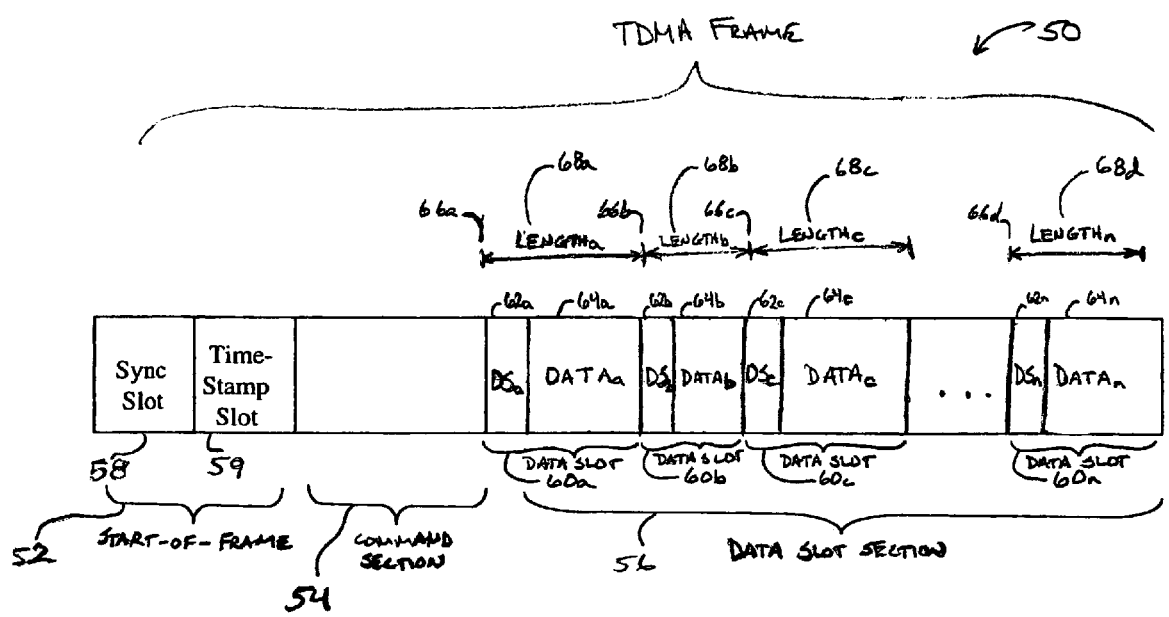
FIG. 3 is a TDMA frame generated by the physical layer of FIG. 2.

Referring to FIG. 3 there is shown an illustrative TDMA frame useable in the present invention. The TDMA frame 50 is an illustrative frame arrangement provided by the Medium Access Control (MAC) protocol of the present invention. The MAC protocol of the present invention provides services at the MAC sublayer of the Data Link layer according to the Open Systems Interconnection (OSI) reference model. The Logical Link Control (LLC) sublayer is the (upper) portion of the Data Link layer and provides virtual linking services to the Network layer of the OSI reference model. Data transmission framing for transceivers 12a–12d is provided by the MAC protocol executed within each transceiver on the network. The MAC protocol provides a TDMA frame definition and a framing control function. The TDMA architecture divides data transmission time into discrete data "frames". Frames are further subdivided into "slots".

TDMA frame 50 is an illustrative frame arrangement provided by the MAC layer protocol of the present invention. In general, the MAC layer of the present invention provides the master device 12 with the functions and routines for carrying out the operation of managing each TDMA frame 50 which is communicated in the network system 10. In the preferred embodiment, the TDMA frame 50 comprises a Start-Of-Frame slot 52, a command section 54, and a data slot section 56. The data slot section 56 is further subdivided into a plurality of data slots 60a through 60n.

The architecture of TDMA frame definition 50 provides for isochronous data communications between the master transceiver 12a and the slave transceivers 12b–12d. It shall be appreciated by those skilled in the art that isochronous data communications refers to processes where data must be delivered within a certain time constraint. Isochronous data communication is supported by frame definition 50 by sharing transmit time so that each transceiver 12a–12d is permitted to transmit data during a specific allotted time slot.

Asynchronous communication is also supported by the TDMA frame definition 50. It shall be appreciated by those skilled in the art that asynchronous data communications refers to communications in which data can be transmitted intermittently rather than in a steady stream. Within the TDMA frame, slots may be assigned as a random access slot using a technique such as Carrier Sense Multiple Access with Collision Avoidance (CSMA-CA). For the illustrative CSMA-CA case, the master 12a creates a slot to be used as a random access slot. The master 12a then communicates through the command slot to all random access capable devices that this slot is now available for random access. The master 12a also communicates the start and length of the command slot. The random access slot might be used for all Internet Protocol (IP) devices, for example, such that all IP capable devices will listen to and transmit using only the random access slot reserved for IP traffic. Each IP device on the network listens to this slot. If no communication is detected in this slot for a certain number of frames, this channel is considered "free". A device wishing to transmit waits until the channel is free before transmitting, and then start packet transmission by transmitting in the random access slot for each frame until the transmission was completed. Various schemes for collision avoidance are known in the art.

The Start of Frame slot 52 includes a synchronization slot 58 and a timestamp slot 59. The synchronization slot 58 identifies the start of each new TDMA frame and synchronizes the master device 12a with the slave device 12b through 12d. The synchronization slot 58 from the master transceiver 12a includes a master synchronization code which is generated at least once per frame. Preferably, the master synchronization code comprises a unique bit pattern which identifies the master transceiver as the source of transmission with timing information associated with the master clock in the clock synchronization unit of the master transceiver. By way of example and not of limitation, the master synchronization code uses a 10-bit code comprising "0111111110".

Various encoding schemes known in the art may be used to guarantee that the master synchronization code within synchronization slot 58 will not appear anywhere else in the data sequence of the TDMA frame 50. For example, a common encoding scheme is 4B/5B encoding, where a 4-bit values is encoded as a 5-bit value. Several criteria or "rules" specified in a 4B/5B, such as "each encoded 5-bit value may contain no more than three ones or three zeros" and "each encoded 5-bit value may not end with three ones or three zeros", ensure that a pulse stream will not have a string of six or more ones or zeros. Other encoding techniques known in the art may also be used for master synchronization code including bit stuffing or zero stuffing.

The timestamp slot 59 includes a bit-field which is incremented by a timestamp counter (not shown) in the master device 12a. The timestamp slot 59 permits the master 12a to dynamically reassign the data slot time and length parameters. In operation, the master 12a determines a predetermined time interval required for the modification of the data slot time for data slots 60a through 60n and/or data slot lengths 68a through 68n of the slave devices.

The command section 54 is used by the master transceiver 12a to manage network communications. More particularly, the command section 54 contains a protocol message which is exchanged between the transceiver devices 12a through 12d of network 10 for managing network communications. The flow of protocol messages in the command slot 42 may be governed, for example, by a sequence retransmission request or "SRQ" protocol scheme wherein confirmation of protocol transactions are provided following completion of an entire protocol sequence.

The data slots 60a through 60n are assigned by the master device 12a to requesting slave devices 12b through 12d. Data slots 60a through 60n are further structured and configured to be arranged dynamically and permit the reassigning of the relative start time and the length of the data slots 60a through 60n within the data slot section 56 of the frame 50. This arrangement allows the master device 12a to dynamically manage the usage of the data slot section 56 to optimize the bandwidth capabilities of the transport medium of the network and the devices of the network. Thus, the master device 12a may allocate a wider data slot to a slave device which can utilize a wider bandwidth. Conversely, the master device 12a may also allocate a narrower data slot to a slave device which has more limited bandwidth capabilities. The granularity for data slots 60a through 60n is one (1) symbol. The granularity for data slots 60a through 60n is allocated by the master device 12a.

Each data slot 60a through 60n has a corresponding data synchronization sub-slot 62a through 62n and a data payload sub-slot 64a through 64n. The data payload 64a through 64n contains the encoded actual data or bit information which is transmitted from the source device to the target device. The data synchronization sub-slot 62a through 62n are used by each device for providing timing synchronization signals to a corresponding target devices to accommodate for propagation delays between the source and target devices. Propagation delays vary in length depending on the distance between source and target devices. As described above, the master synchronization code provides timing signals to allow slave devices to synchronize with the master clock of the master device 12a. Likewise, the symbols within the data synchronization sub-slot 62a through 62n are symbols which allow target slave devices to synchronize with corresponding source slave devices using similar synchronization algorithms such as phase offset detectors and controllers. Proper target-to-source device synchronization is fundamental for reliable data communication exchange between the slave device.

Each data slot 60a through 60n has a corresponding slot start time 66a through 66n and corresponding slot length 68a through 68n. The slot start time 66a through 66n corresponds to the time position within the data slot section 56 of the frame at which point the device begins its transmission. The slot length 68a through 68n measured from the slot start time provides the time position within the frame at which transmission is terminated for the data slot for each frame. The slot lengths 68a through 68n corresponds to the bandwidth allocated to the devices within the data slot section 56 of the frame and may be of varying lengths as assigned by the master device 12a.

The framing control unit 32 in the slave devices 12b through 12d provide framing means such as local counters, correlators, phase lock loop functions, and phase offset detectors and controllers which allow frame synchronization between slave devices 12b through 12d and the master device 12a to be reestablished when the size or length of frame 50 is altered by the master device 12a.

Figure 4:
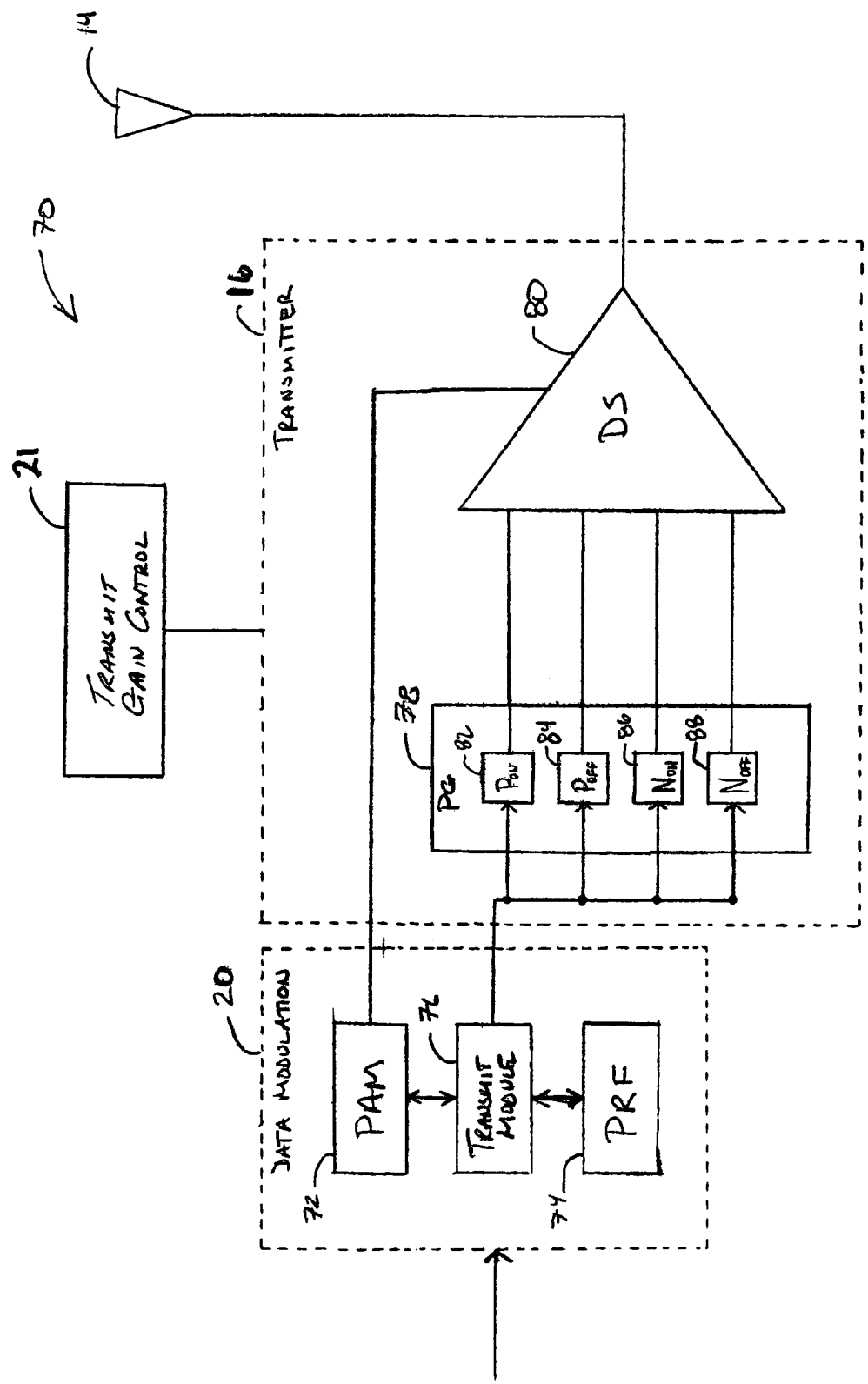

Referring to FIG. 4, there is shown a block diagram of a preferred transmitter system that may be used in the present invention. The transmitting system 70 includes a data modulation unit 20, a transmit gain control unit 21, a transmitter 16, and an antenna 14. The data modulation unit 20 further comprises a pulse amplitude modulation module 72, a pulse repetition frequency module 74 and a transmit module 76.

The pulse repetition frequency module 74 permits varying pulse repetition frequencies to be transmitted. The added benefit of varying pulse repetition frequencies is that it permits transmitting variable bit rates depending on the environmental conditions, such as signal-to-noise ration and/or bit error rate which affect the transceiver signals. Another benefit of varying pulse repetition frequencies is that it reduces the amount of interference generated by a base band transmitter to narrowband receivers. Thus, transmitted signals which fall within the frequency range of the narrowband receiver appear intermittently to the narrowband receiver and thereby reduce interference to the narrowband receiver.

More particularly, the pulse repetition frequency module 74 includes a clock divider which changes the pulse repetition frequency generated by the transmitter. The clock divider is coupled to the transmit module which communicates with the transmitter 16. It shall be appreciated by those skilled in the art having the benefit of this disclosure that a clock divider is capable of dividing clicking signals so that the pulse repetition frequency may be changed at a constant rate or at a variable rate.

The transmit module 76 generates the digital transmit pulse signals which are communicated to the transmitter 16 pulse generator system 78. Additionally, the transmit module 76 is configured to use different modulation techniques such as pulse amplitude modulation (PAM) and on-off keying (OOK) based on channel characteristics. By way of example and not of limitation, two transceivers are communicating to one another and determine that the Bit Error Rate (BER) is too high for the existing communication link. The system and method of the present invention provides for these transceivers to negotiate to use a different modulation technique, such as moving from 8-level PAM to 4-level PAM. Thus, in the illustrative example, each transceiver configures its respective transmitter to modulate the signal with the new modulation technique.

If the transmit module detects that a signal is modulation by OOK, the OOK signal is communicated directly to the transmitter 16. If the transmit module detects that a signal is modulated by PAM, then the transmit signal is communicated to the PAM module 72 and to the transmitter 16.

It shall be appreciated by those skilled in the art that various forms of pulse modulation may be employed by data modulation unit 20. A typical modulation technique is on-off keying (OOK) wherein the presence and absence of pulses represent the "ones" and "zeros", respectively, of digital information. In this typical situation, the data modulation unit 20 causes a pulse to be generated at the appropriate bit time to represent a "one" or causes the absence of a pulse to represent a "zero."

Another modulation method well known is the art is pulse amplitude modulation. Pulse amplitude modulation allows the amplitude of a pulse to represent a digital value so that the number of bits may be represented by a single base band signal. By way of example and not of limitation, a three bit symbol can be represented with eight levels of pulse amplitude.

The pulse amplitude module 72 receives digital signal to modulate with pulse amplitude modulation. The pulse amplitude modulation module 72 communicates the desired level of amplitude modulation to an digital-analog-converter (DAC). The DAC converts the digital signals to analog signals of various amplitudes and communicates this the drive system, so that the drive system may amplify the pulses. The digital signals are also communicated to the pulse generator system, so that the signals may take the appropriate shape. A clock within the pulse amplitude modulation module 72 ensures that the signals generated by a pulse generator system 78 are properly timed for amplification by a drive system 80.

The modulation technique for the pulse stream generated by the data modulator 20 is synchronized with a master clock associated with the clock synchronization unit 34, and is sent in an appropriate time slot according to a frame definition provided by the framing control unit 32. As previously described, to maintain a synchronized network, one device must serve the function of being a clock master and maintaining the master clock for the network 10.

The transmitter 16 includes a pulse generator system 78 and a drive system 80. The pulse generator system 78 is presented with an input transmit pulse signal from the transmit module 76 and generates pull-up signals and pull-down signals. More particularly, a plurality of pull-up turn-on pulses generated by the Pon module 82, and pull-up turn-off pulses generated by the Poff module 84 are produced by the pull-up circuit. Additionally, a plurality of pull-down turn-on pulses are generated by the Non module 86, and a plurality of pull-down turn-off pulses are generated by the Noff module 88.

In operation, each module 82, 84, 86 and 88 of pulse generator 42 is presented with edge of an input transmit pulse. The edge of the input pulse is communicated to a plurality of pair of edge delay circuits which generate a plurality of leading edges and trailing edges. Each edge is a delayed by a particular time interval. The trailing edges are generated by inverting a delayed edge. A plurality of NAND gates combine the plurality of pairs of leading and trailing edges. The outputs from the Pon module 82, the Poff module 84, the Non module 86 and the Noff module 88 are communicated to the drive system described below.

Figure 4B:
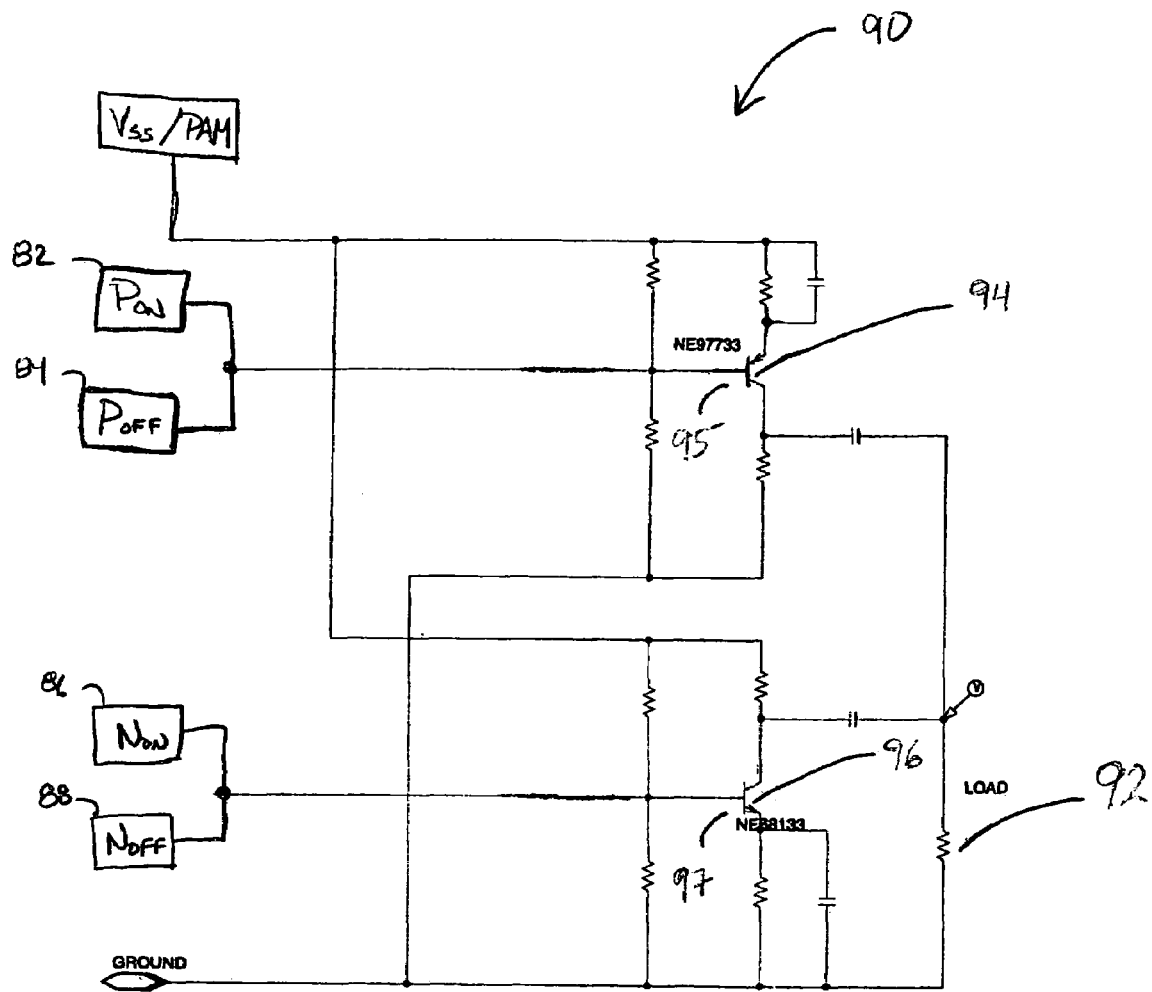

Referring to FIG. 4b, there is shown a schematic diagram of a preferred driver system 90, namely, a transistor drive system 90 which may be used by the present invention. The transistor drive system generates the output signal which is communicated to antenna 14 and identified as load 92 in FIG. 4b. The pull-up circuit which generates the output signal excursion submitted to the antenna includes a bipolar pnp transistor 94. The pnp transistor 94 is a pull-up transistor in a common emitter configuration that receives the pull-up signals at its base 95. The pull-down circuit which generates the negative going signal excursion includes a bipolar npn transistor 96. The npn transistor 96 is a pull-down transistor in a common emitter configuration that receives the pull down signals at its base 97. The outputs from the bipolar transistors are capacitively coupled to a load, which is preferably an antenna which radiates the output signal.

As previously described, the output signals generated by the signal generate may operate, for example, between the 2.5 GHZ to 5.0 GHz range. As these operating frequencies, the base-emitter capacitance at each transistor prevent the bipolar transistors from rapidly turning off. To ensure rapid turnoffs the pnp transistor 94 and the npn transistor 96 generate "turn off" signals which discharge the base-emitter capacitance at each transistor 94 and 96. The discharging of the base-emitter capacitive charge turns off the transistors.

Figure 5:
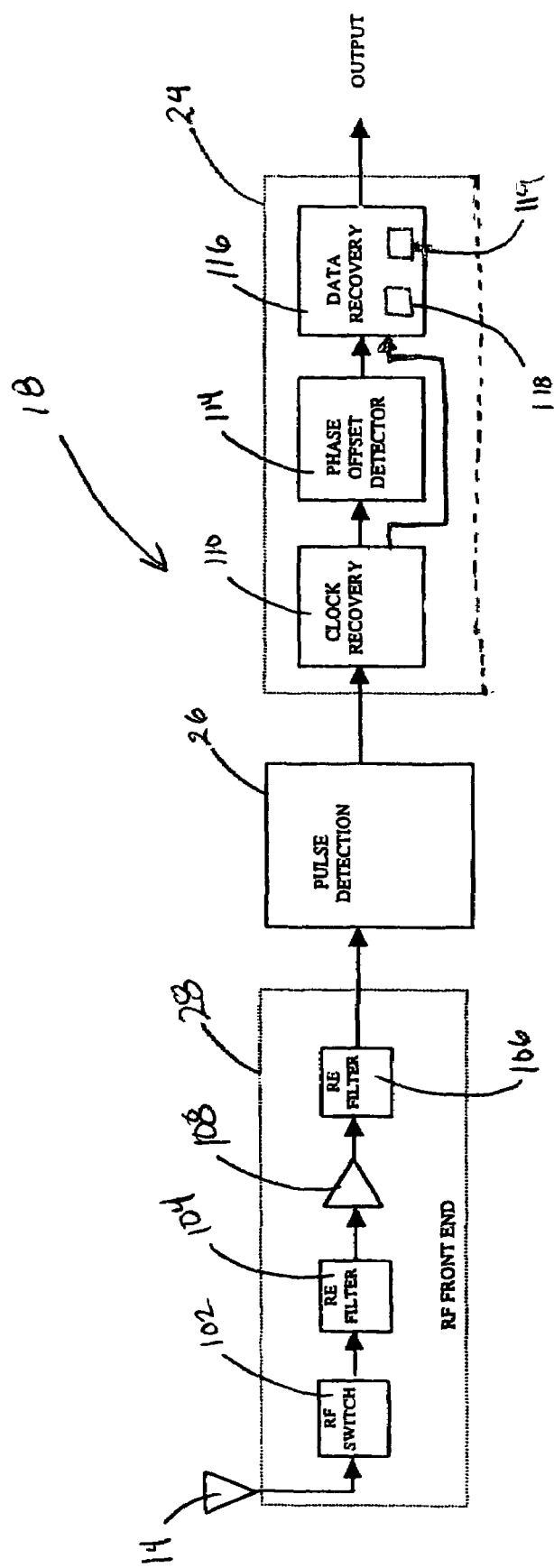
FIG. 5 is a block diagram of a receiver that may be used in the present invention.

Referring to FIG. 5, there is shown a preferred receiver apparatus 18 which may be used by the present system and method. The receiver apparatus 18 comprises an RF front end section 28, a pulse detection unit 26 wherein modulated, ultra wide band pulses are detected, and a data recovery unit 24 wherein clock and data recovery from the detected pulses are carried out. The invention may be embodied in various hardware or circuitry configurations, and is preferably embodied in a single IC device.

The RF front end 28 of the receiver 18 apparatus generally comprises an antenna 14 together with means for filtering and amplifying RF signals received by the antenna 14. The antenna 14 at the RF front end is preferably a ground plane antenna having an edge with a notch or cutout portion operating at a broad spectrum frequency ranging from about 2.5 gigahertz (GHz) to about 5 GHz, with the center frequency at about 3.75 GHz. An RF switch 102, which may be a conventional antenna switching circuit, is preferably included in association with the antenna 14 to allow the antenna 14 to be shared with the transmitter 16, so that the receiver system of the invention may be implemented together with a transmitter 16 in a transceiver device. The filtering and amplification means preferably comprises one or more band pass filters, such as filters 104 and 106, and one or more low noise, variable gain amplifiers, such as amplifier 108. It shall be appreciated by those skilled in the art that the type, number and configuration of filters and amplifiers used in the front end may vary as required for particular applications of the invention. The RF front end 28 converts the received RF pulses into corresponding voltage signals from which pulse information is detected. Gain control 30 in the form of an automatic gain control loop (AGCL) may also be included with the RF front end.

The pulse detection unit 26 is preferably an envelope detection circuit, and preferably includes a first amplifier, a high (GHz range) operating frequency detector diode, a high pass or band pass filter, a second amplifier, and a comparator. The detector diode is preferably tunnel diode or Schottky diode which provides for envelope detection, rectifies the incoming voltage signals from the RF front end, and provides a power envelope. The filter removes any long term DC or noise components from the signals. The comparator provides threshold detection means and generates pulses when the filtered, rectified voltage signals exceed a predetermined threshold voltage. The shape of the pulsed envelope of the incoming signal can be evaluated from the output of the envelope detection circuit. As in the RF front end, the particular filtering and amplification used in the envelope detection circuit may be varied as required for particular uses of the invention.

The data processing unit 24 retrieves information from the detected pulses output by the pulse detection unit. The data processing unit preferably comprises a clock recovery module 110 for generating master clock timing information from the detected pulse stream, a pulse repetition frequency module 112 for sampling at the right pulse repetition frequency, a phase offset detector 114 for determining delays associated with pulsed data transmission from non-master networked devices, and a data recovery unit 116 for determining digital values from a detected pulse stream according to timing information from the clock recovery module 110 and phase offset information from the phase offset detector 114.

The clock recovery unit 110 generally includes a mask for suppressing selected pulses. Preferably, a pulse stretcher is also included for dilating or stretching pulses to simplify processing by digital logic. A pulse sampler is included in the clock recovery unit to sample the pulses. A correlator is provided for matching incoming pulse trains to the known "master sync code" associated with the master clocking synchronization unit 34. A synchronization code predictor generates mask signals for suppressing pulses which are not associated with expected pulsed synchronization codes. A phase-locked loop (PLL) synchronizes a local clock in the receiver apparatus to a master clock according to detected or predicted master sync codes. The timing information thus generated is directed to the phase offset detector and data recovery function.

The phase offset detector 114 includes a mask for suppressing selected pulses received from the envelope detector circuit. A pulse stretcher may also be included in the phase offset detector 114 to facilitate subsequent sampling by digital logic. A data header predictor receives output from the correlator in the clock recovery unit 110 and generates mask signals according to detected or expected data header codes in the pulse stream. Timing information from the PLL in the clock recovery unit 110 is directed to an offset detector. The offset detector oversamples the incoming pulse train and determines the phase offset or delay between the phase locked bit clock and the incoming pulses. The phase offset thus determined is provided to the data recovery unit 116.

The data recovery unit 116 uses the phase lock clock information from the PLL and the phase offset from phase offset detector 114 to sample the incoming pulse stream having a variable pulse repetition frequency at the appropriate, phase offset corrected times, and provide a digital value for each incoming symbol in the pulse stream. To determine the pulse repetition frequency in a variable pulse repetition frequency environment, the receiver includes a divider circuit 118 operatively coupled to PLL in the clock recovery function 100 and to a digitally controlled delay circuit or sampling timer circuit. In a variable pulse repetition frequency environment, the divider circuit 118 provides the function of determining the sampling rate for signals submitted to data recovery unit 116. The divider circuit divides the rate of data sampling according to the sampling rate detected by PLL. The divider circuit 118 communicates the data sampling rate to the delay circuit or sampling circuit. The delay or sampling circuit is also coupled to the phase offset detector 114. The sampling circuit or delay circuit provides the function of determining when to sample the incoming data signals according to output generated by both the divider circuit and the phase offset detector 114.

An analog-to-digital converter (ADC) in the data recovery function receives the analogue output from the envelope detector and decodes it to digital values according to the determined sample timing. A decoder 119 converts the digital values from the ADC to symbols. For different modulation method such as pulse amplitude modulation or on-off keying, the decoder 119 is capable of detecting different threshold levels which identify the particular modulation method. In the case of on-off keying, the presence or absence of a pulse at the sampled time corresponds to a digital "one" or "zero". For on-off keying modulation, ADC may be a one-bit ADC, or alternatively, a comparator circuit. In the case of pulse amplitude modulation, decoder 119 utilizes quantization levels to determine the output value per measured voltage level. In one embodiment wherein pulse amplitude modulation is used, eight voltage levels are used to produce a three-bit value. The symbol output is delivered to higher protocol layers of the network system.

Figure 6A:
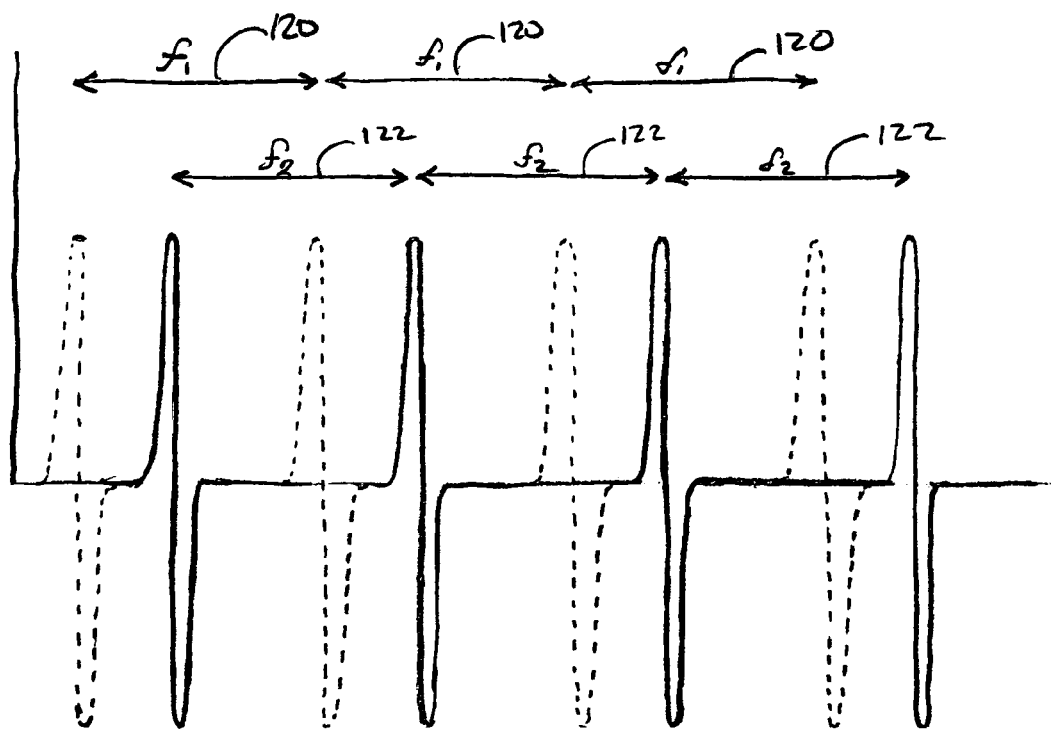
FIG. 6a is a typical waveform of two pulses having different pulse repetition frequencies.

Referring to FIG. 6a, as well as FIG. 1 and FIG. 3, there is shown an illustrative example of two output signals associated with antenna 14 transmitting at a variable pulse repetition frequency. The illustrative example shows two signals being transmitted at two different pulse repetition frequencies. The first typical signal has a pulse repetition frequency is identified as $f_1$ 120 and is represented by the base band pulses having dotted lines. The second typical signals have a particular pulse repetition frequency identified as $f_2$ 122. Preferably, the baseband transceiver of the present invention is configured to transmit and receive different pulse repetition frequencies for each slot in the TDMA frame 50. As previously described, the pulse repetition frequency may be changed at a constant rate or at a variable rate.

Figure 6B:
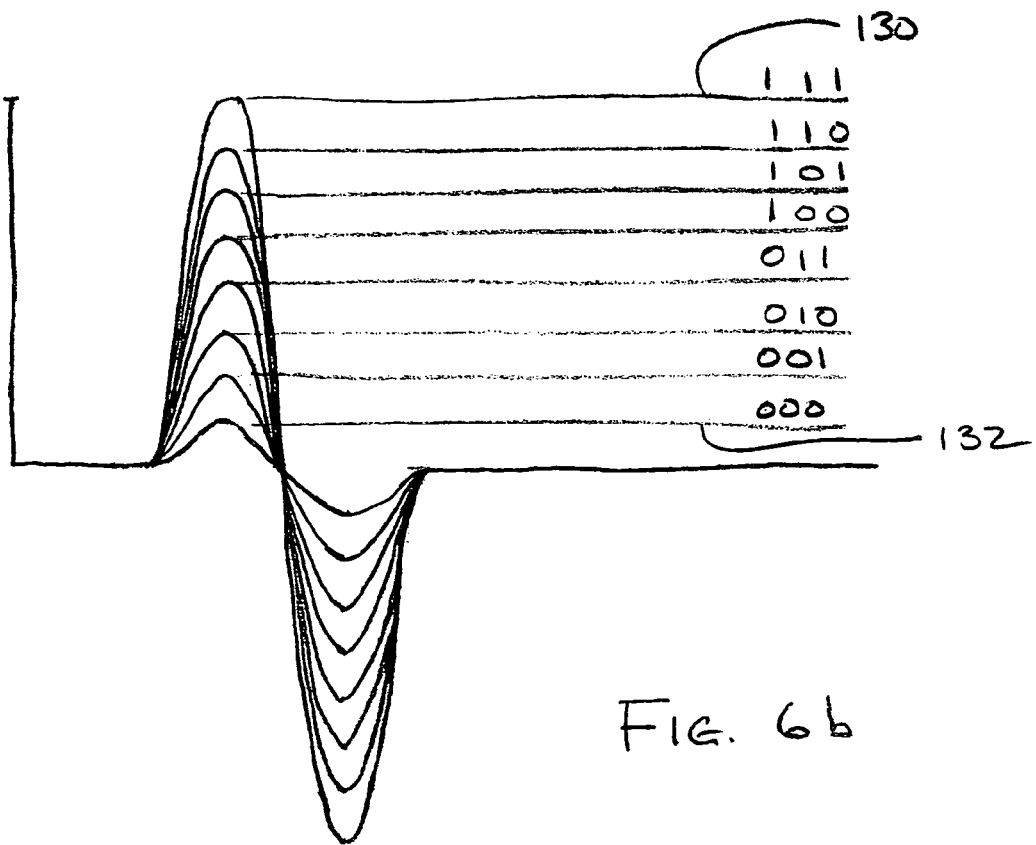
FIG. 6b is a typical waveform of a pulse amplitude modulation of a waveform which represents three bits.

Referring to FIG. 6b, as well as FIG. 1, there is shown an illustrative example of possible output signals representing a three-bit sequence. The output signals are transmitted by antenna 14 employing pulse amplitude modulation. In pulse amplitude modulation the information is conveyed by the amplitude of the pulse. The illustrative example shows a signal having a maximum amplitude 130 representing a three-bit sequence, 1 1 1. The illustrative example also shows a signal having a minimum amplitude 132 representing a three-bit sequence, 0 0 0. The various PAM levels between the minimum amplitude sequence 130 and the maximum sequence 132 provide eight different amplitude levels which represent one of the eight possible three-bit sequences.

Figure 7:
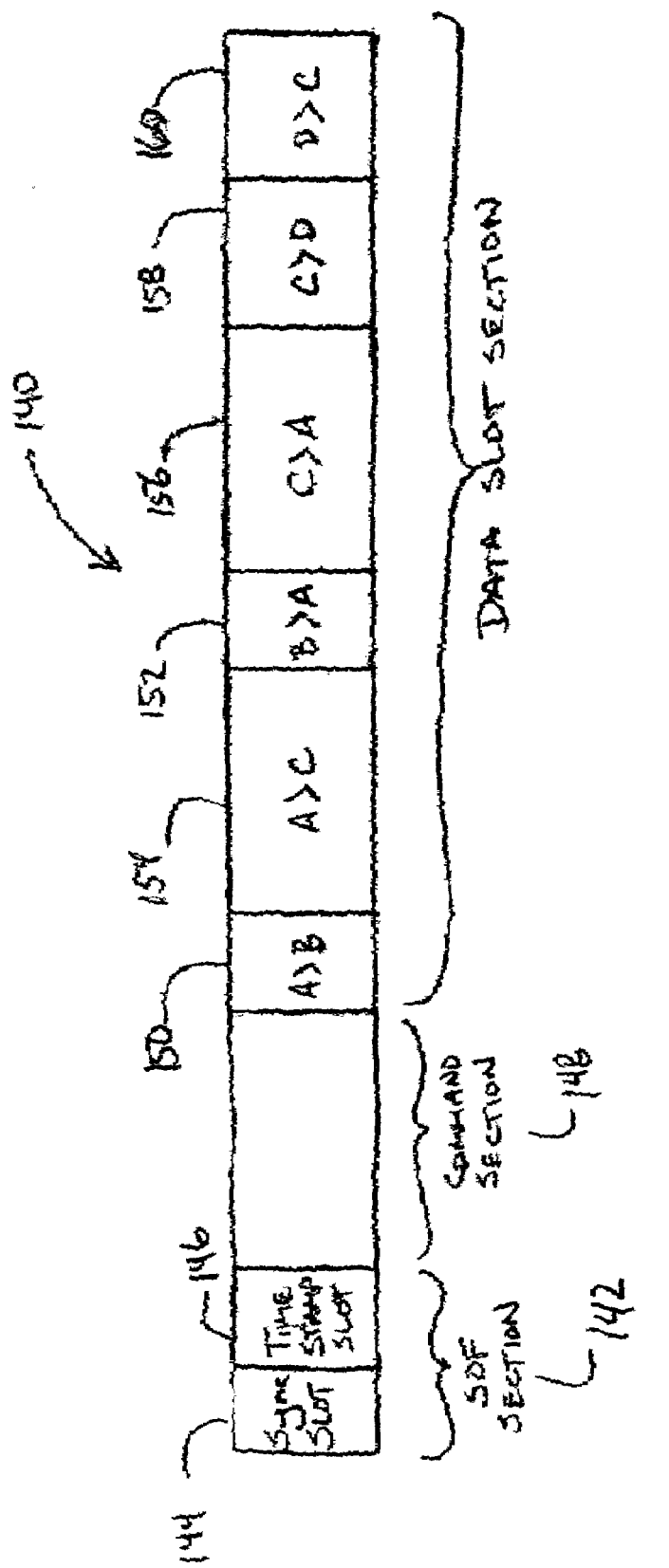
FIG. 7 is a typical TDMA frame having variable size data slots.

Referring to a typical TDMA frame 140 of FIG. 7, as well as FIG. 3, FIG. 2 and FIG. 1, there is shown the TDMA frame 140 which communicates different modulation methods at variable pulse repetition frequencies for network system 10. It shall be appreciated that the TDMA frame 140 is substantially similar to TDMA frame 50, with the exception that the data slots in the data slot section 12a through 12d communicate variable size data slots to the devices in the typical network.

A SOF section 142 which includes a synchronization slot 44. The synchronization slot 144 identifies the start of each new TDMA frame and synchronizes the master device 12a with the slave device 12b through 12d. In its preferred embodiment, the master device 12a transmits a unique synchronization symbol within the synchronization slot 144, which does not appear anywhere else within the frame to identify the start of each new frame. The unique synchronization symbols are used by each of the slave devices 12b through 12d on the network to ascertain the beginning of each from the incoming data stream.

The network is synchronized by the clock 13 in the master transceiver and clock recovery module in the slave transceivers. Each node device in the network system maintains a clock running at a multiple of the bit rate of transmission. The clock synchronization unit 34 in the master device maintains the master clock 13 for the network. At least once per frame, the clock synchronization unit 34 issues a "master synchronization code" in the synchronization slot 144. The master sync code is typically a unique bit pattern which identifies the sender as the clock master.

The clock synchronization unit 34 in the slave devices 12b through 12d on the network 10 carries out the operation of recovering clock information from the incoming data stream and synchronizing the slave device to the master device. It shall be appreciated by those skilled in the art having the benefit of this disclosure that the synchronization is accomplished using one or more correlators which identifies the master synchronization code and a phase or delayed locked loop mechanism. By providing a common network clock on the master device, with slave devices synchronizing their local clocks to that of the master clock, support for synchronous, isochronous and asynchronous communication is provided. Time reference between all device nodes is highly accurate eliminating most latency and timing difficulties in isochronous communication links.

The SOF section 142 also includes a timestamp slot 146. The timestamp slot 146 is a bit-field that is incremented by modulo-N timestamp counter located on the master device, where N is chosen to be sufficiently larger than the time required to perform all anticipated slot-reorganization tasks. The modulo-N counter rolls over to zero after reaching N−1. Each slave device 12 through 12d keeps a local copy of the timestamp counter which is also incremented for each frame and is used during frames when the SOF section 142 is determined to be corrupted. The purpose of the local timestamp counter is to allow the local device to recognize the frame time even if the SOF section 142 gets corrupted in one or more frames.

The command section 148 is used for sending, requesting and authorizing commands between the master transceiver 12a and the slave transceivers 12b through 12d of the network. The master transceiver 12a uses the command slot for ascertaining which slave transceivers are on-line, off-line or engaged in data transfer. The master transceiver 12a uses the command slot for ascertaining which slave transceivers are online, off-line, or engaged in data transfer. The master transceiver 12a further uses the command slot for authorizing data transmission request from each of the slave transceivers.

The slave transceivers 12b through 12d use the command slot for requesting data transmission and indicating its start-up (on-line) state, engaged state, or shut-down (off-line) state. The data slots are used for data transmission between the node devices of the network. Generally, each transmitting device of the networks is assigned one or more corresponding data slots within the frame in which the device may transmit data directly to another slave device without the need for a "store and forward" scheme as is presently used in the prior art.

A slave device that is in the "online" state is ready to send or receive data from the other devices on the network 10. Additionally, a slave device is in the "online" state if it is not currently engaged in communication with other slave devices. A slave device is "engaged" when the device is currently communicating with one or more slave devices. For example, where a source slave device is transmitting audio signal data to a target slave device, both the source and target slave device are in the "engaged" state.

By way of example and not of limitation, more detailed information regarding TDMA frame 140 are described by referring to Table 1 which describes typical operating parameters for each device in the network 10. More particularly, Table 1 describes the communications between devices 12a through 12d. The first column of Table 1 identifies the devices in communication. The notation A>B provides that transceiver A, 12a, directs communications to transceiver B, 12b.

TABLE 1

| Device | Bits/Symbol | Symbols/Sec | Max. Data Rate |
|---|---|---|---|
| A > B | 3 | 20 Million | 60 Mbps |
| A > C | 2 | 10 Million | 20 Mbps |
| B > A | 3 | 20 Million | 60 Mbps |
| C > A | 2 | 10 Million | 20 Mbps |
| C > D | 1 | 20 Million | 20 Mbps |
| D > C | 1 | 20 Million | 20 Mbps |

The second column with the heading bits/symbol provides the number of bits that represented by the communicated baseband signal. For example, if three (3) bits/symbol are identified, then for each baseband signal communicated, three (3) bits of information are communicated. To accomplish the three bits per symbol communications, three-bit pulse amplitude modulation is employed. As previously described, three-bit pulse amplitude modulation provides eight different amplitude level which represent one of the eight (8) possible three-bit outputs.

The third column with the heading symbols/sec provides the number of symbols that are communicated by the baseband transceiver for each second of communications. The numbers of symbols communicated per second is dependent on the pulse repetition frequency employed by the network. For example, the pulse repetition frequency to communicate 20 million symbols per second from transceiver A, 12a, to transceiver B, 12b, has a pulse repetition frequency of 20 MHz. To generated communications on the order of 10 million symbols per second, the number of pulses of symbols communicated is one-half (½) of 20 million symbols per second or a pulse repetition frequency of 10 MHz.

The fourth column with the heading maximum data rate combines the bits/symbol column data and symbols/second column data to generate a value of the million bits per second (Mbps). For example, the maximum data rate for the row 1 information is based on multiply 3 bits/symbol by 20 million symbols/second to generate 60 Mbps. A similar calculation for each of the remaining devices is performed to obtain the maximum data rate. It shall be appreciated by those of ordinary skill in the art that the actual data rates are less than the maximum data rate from the fourth column because the TDMA frame is shared with other transceivers in the network.

It shall be appreciated by those with ordinary skill in the art having the benefit of this disclosure that each transceiver 12a through 12b shares the ability to encode and decode symbols employing 3-bit PAM, 2-bit PAM, 1-bit PAM and OOK at a symbol rate that is dependent on the pulse repetition frequency. The use of each of the particular modulation methods described and of the particular pulse repetition frequencies described are not intended to be restrictive, rather they are intended to provide a description of a working embodiment for the present invention.

Referring back to FIG. 7 and Table 1, TDMA frame 140 presents the data slots 150 and 152 for communications between transceiver A, 12a, and transceiver B, 12b. The data slot 150 and 152 have a particular slot start time and slot length. The typical slot length for communications from transceiver A to transceiver B is the same as the slot length for communications from transceiver B to transceiver A. Data slots 154 and 156 provide communications between transceiver A, 12a, and transceiver C, 12c. It shall be appreciated by those skilled in the art having the benefit of this disclosure that the slot length for data slots 154 and 156 is longer than the longer than the slot length for data slots 150 and 152. Data slots 158 and 160 provide the data slot communications between transceiver C, 12c, and transceiver D, 12d. It shall be appreciated by those of ordinary skill in the art having the benefit of this disclosure that the master device, 12a, maintains communications by synchronizing the communications between transceivers 12a through 12d. Additionally, that each of the data slots 158 and 160 has a particualr start time and slot length. The slot length for data slots 158 and 160 is smaller than the slot length of data slots 154 and 156. Further, the slot length for data slots 158 and 160 is larger than the slot length of data slots 150 and 152.

Referring back to Table 1, the slot communications between transceiver A, 12a, and transceiver B, 12b, is 3 bits per symbol at 20 million symbols per second to produce a maximum data communication rate of 60 Mbps. The 3-bit per symbol modulation is supported by pulse amplitude modulation. The slot communications between transceiver A, 12a, and transceiver C, 12c, is 2 bits per symbol at 10 million symbols per second to produce a maximum data communication rate of 20 Mbps. The 2-bit per symbol modulation is supported by 2-bit pulse amplitude modulation. The slot communications between transceiver C, 12c, and transceiver D, 12d, is 1 bit per symbol at 20 million symbols per second to produce a maximum data communication rate of 20 Mbps. It shall be appreciated by those of ordinary skill in the art, that the 1-bit modulation method may be perform by 1-bit pulse amplitude modulation or on-off keying.

Figure 8A:
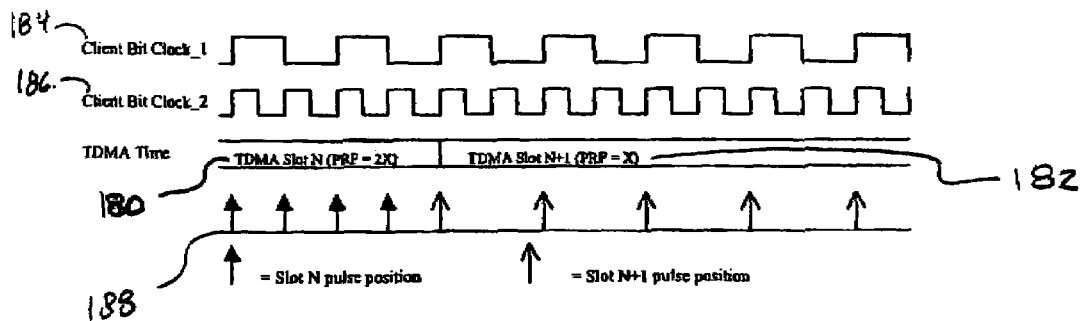
FIG. 8a is a typical TDMA slot having different pulse repetition frequencies.

Referring to FIG. 8a, as well as FIG. 7, FIG. 3 and FIG. 1, there is shown a typical illustrative example of the timing for two TDMA slots having different pulse repetition frequencies. A first typical TDMA slot 180 and second typical TDMA slot 182 provides communications within a data slot, such as shown in FIG. 7.

To accommodate variable pulse repetition frequencies for each TDMA slot, the master sync code synchronizes communications between transceiver devices using a clock synchronization unit 34 operating at a nominal pulse repetition frequency that the system 10 will support. The transmitter unit 16 and receiver 18 are capable of frequency multiplying the clock from the clock synchronization unit 34 to support higher pulse repetition frequencies. The pulse repetition frequencies employed may be depend on the devices particular bandwidth demands, noise constraints, or signal reflection.

Client bit clock_1, 184, provides the timing for the pulse repetition frequency associated with TDMA Slot N+1, 182. The signals transmitted by TDMA slot 182 are transmitted during the leading edge of client bit clock_1, 184. Client bit clock_2 186 provides the timing for the pulse repetition frequency associated with TDMA slot N 180. The signals transmitted by TDMA Slot N 180 are transmitted during the leading edge of client bit clock_2 186. The pulse repetition frequency for TDMA Slot N, 180, is two times greater, i.e. faster, that the pulse repetition frequency for TDMA Slot N+1, 182. The pulse repetition frequency for TDMA Slot N, 180, and TDMA Slot N+1, 182, is identified by the frequency pulses, identified by arrows, shown in line 188.

Figure 8B:
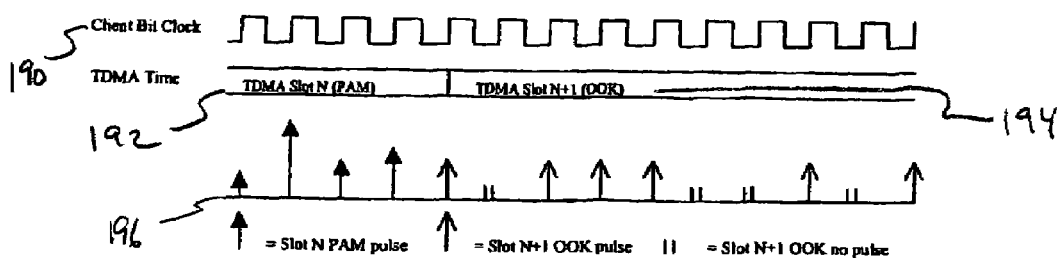
FIG. 8b is a typical TDMA slot having two different modulation methods associated with both slots.

Referring to FIG. 8b there is shown a typical example of the transceiver timing having a different modulation method for each TDMA slot. A client bit clock 190 provides the timing for the two typical TDMA slot in the data slot section of TDMA frame 140 or TDMA frame 70. The two typical TDMA frames are identified as TDMA Slot N, 192, and TDMA Slot N+1, 194. It shall be appreciated by those skilled in the art having the benefit of this disclosure that for TDMA Slot N, 192, the signal transmitted employs pulse amplitude modulation as depicted by the symbols in line 196. The timing for each of the pulses having a different amplitude is established by the client bit clock 190. Additionally, it shall be appreciated by those skilled in the art that for TDMA Slot N+1 194 the signal transmitted employs on-off keying as depicted by the symbols in line 196. Again, the timing for each of the pulses operating with on-off keying is established by the client bit clock 190.

The techniques described above use different bit pulse repetition frequencies and modulation techniques for baseband communications or ultra-wide-band communications. An additional modulation technique referred to as pulse-position modulation is well known in the art and may also be employed with the present system and method. During pulse position modulation, pulses are transmitted at some basic symbol frequency, e.g. 20 MHz. At 20 MHz symbol repetition frequency suggests that pulses be spaced 50 nanoseconds apart. A pulse falling exactly where expected may indicate a binary "1", while a pulse delayed by some small delta time may indicate a binary "0".

The system of the present invention may be broadened for use with carrier signals and other modulation technique. Therefore, while embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A network communication system, comprising:
 a first device having a first data bandwidth requirement, said first device configured to transmit and receive data at different data rates;
 a second device having a second data bandwidth requirement; said second device configured to transmit and receive data at different rates and configured to communicate with said first device; and
 a master transceiver configured to manage data communications between said first device and said second device by assigning a variable length data slot based on the first device and the second device bandwidth requirements;
 wherein said communications between said first device and said second device is configured to operate in an ultra wide band environment.

2. The network communication system of claim 1, wherein said communication between said first device and said second device is configured to be performed in a wireless environment.

3. The network communication system of claim 1, wherein said transmitted and received data rates between said first and said second device varies as a function of noise or reflection.

4. A network communication system, comprising:
 a first slave transceiver configured to communicate a plurality of TDMA data packets at different data rates;
 a second slave transceiver configured to communicate a plurality of TDMA data packets at different data rates to said first slave transceiver; and
 a master transceiver configured to manage data communications between said first slave transceiver and said second slave transceiver by assigning a variable length data slot within each of the plurality of TDMA data packets;
 wherein said communication between said first slave transceiver and said second slave transceiver is configured to operate in an ultra wide band environment.

5. The network communication system as recited in claim 4, wherein said master transceiver is further configured to synchronize communications between said first slave transceiver and said second slave transceiver.

6. The network communication system as recited in claim 4, further comprising a third transceiver in communications with said master transceiver, said third transceiver configured to communicate a plurality of TDMA data packets at different data rates.

7. The network communication system as recited in claim 4, wherein said communication between said first slave transceiver and said second slave transceiver is configured to be performed in a wireless environment.

8. The network communication system as recited in claim 4, wherein said plurality of TDMA data packet communication between said first slave transceiver and said second slave transceiver varies as a function of noise or reflection.

* * * * *

(12) INTER PARTES REEXAMINATION CERTIFICATE (0159th)
United States Patent
Sparrell et al.

(10) Number: US 6,970,448 C1
(45) Certificate Issued: May 11, 2010

(54) WIRELESS TDMA SYSTEM AND METHOD FOR NETWORK COMMUNICATIONS

(75) Inventors: Carlton Sparrell, Palo Alto, CA (US); Roberto Aiello, Palo Alto, CA (US); Gerald Rogerson, Morgan Hill, CA (US); Minnie Ho, Palo Alto, CA (US)

(73) Assignee: Pulse Link, Inc., San Diego, CA (US)

Reexamination Request:
No. 95/000,374, Jun. 6, 2008

Reexamination Certificate for:
| Patent No.: | 6,970,448 |
| Issued: | Nov. 29, 2005 |
| Appl. No.: | 09/603,310 |
| Filed: | Jun. 21, 2000 |

(51) Int. Cl.
*H04B 7/212* (2006.01)

(52) U.S. Cl. ........................................ 370/347; 370/321
(58) Field of Classification Search ........................ None
See application file for complete search history.

(56) References Cited

U.S. PATENT DOCUMENTS

| 4,763,325 | A | * | 8/1988 | Wolfe et al. | ................. | 370/322 |
| 5,295,140 | A | | 3/1994 | Crisler et al. | | |
| 5,515,366 | A | * | 5/1996 | Chieu et al. | ................. | 370/347 |
| 5,687,169 | A | * | 11/1997 | Fullerton | ..................... | 370/324 |
| 5,787,080 | A | * | 7/1998 | Hulyalkar et al. | ........ | 370/310.2 |
| 5,886,989 | A | | 3/1999 | Evans et al. | | |
| 5,889,767 | A | * | 3/1999 | Kimura | ....................... | 370/314 |
| 6,097,707 | A | * | 8/2000 | Hodzic et al. | ............... | 370/321 |
| 6,668,008 | B1 | * | 12/2003 | Panasik | ....................... | 375/139 |
| 6,700,939 | B1 | * | 3/2004 | McCorkle et al. | ........... | 375/295 |
| 6,711,177 | B1 | * | 3/2004 | Young | ......................... | 370/468 |
| 6,970,448 | B1 | * | 11/2005 | Sparrell et al. | .............. | 370/347 |

OTHER PUBLICATIONS

Khun–Jush, et al "Hiperlan type 2 for broadband wireless communication" The Ericsson Review: The Telecommunications Technology Journal pp. 108–119 No. 2, 2000.

Khun–Jush et al "Structure and Performance of the HIPERLAN/2 Physical Layer" Vehicular Technology Conference pp. 2667–2671 IEEE 1999 Downloaded from IEEE Xplore Oct. 21, 2008.

Li et al. "Automatic Repeat Request (ARQ) Mechanisms in HIPERLAN/2" 2000 IEEE 51st Vehicular Technology Conference Proceedings May 15–18, 2000, Tokyo Japan pp. 2093–2093 Institute of Electrical and Electronics Engineers, Inc.

Prasad et al "A State–of–the–Art of HIPERLAN/2" Vehicular Technology Conference pp. 2661–2666 IEEE 1999 Downloaded from IEEE Xplore on Oct. 21, 2008.

Torsner et al "Radio Network Solutions for HIPERLAN/2" pp. 1217–1221 IEEE 1999 Downloaded from IEEE xplore on Oct. 21, 2008.

(Continued)

*Primary Examiner*—Lynne H. Browne

(57) ABSTRACT

The present invention describes a network communication system which includes a first slave transceiver configured to communicate a plurality of TDMA data packets at different data rates to a second slave transceiver. The second slave transceiver is also configured to communicate a plurality of TDMA data packets at different data rates to the first slave transceiver. A master transceiver manages data communications between the first slave transceiver and the second slave transceiver. Each transceiver includes a data modulation unit, a transmitter, an antenna, and a receiver. The data modulation unit is configured to generate a plurality of signals having variable pulse repetition frequencies and different modulation techniques. The transmitter is coupled to the data modulation unit and the transmitter is configured to generate a pulse stream according to the data modulation unit. The transmitting antenna is coupled to the transmitter and the transmitting antenna is configured to transmit a plurality of ultra wide band base band signals. The receiver is configured to detect and demodulate said ultra wide band base band signals operating at variable pulse repetition frequencies and having different modulation methods.

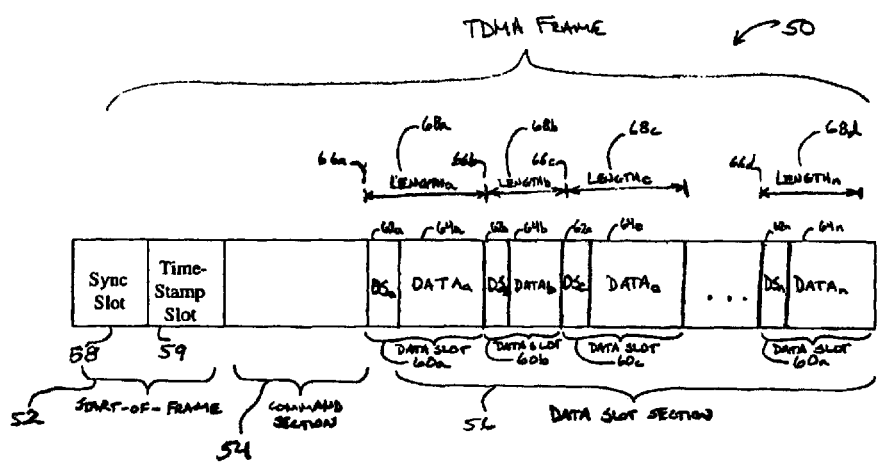

OTHER PUBLICATIONS

Umehira et al "A 5GHz–band Advanced Wireless Access system For Mobile Multimedia Applications" 2000 IEEE 51st Vehicular Technology Conference Procedings May 15–18, 2000 Tokyo Japan pp. 2300–2304 The Institute of Electrical and Electronics Engineers, Inc.

Hettich et al "IEEE 802.11 or ETSI BRAN HIPERLAN/2: Who Will Win the Race for a High Speed Wireless LAN Satandard?" European Wireless '98 Mobile Kommunikation pp. 169–174 Berlin, Germany 1999.

Zhu et al "A Five–Phase Reservation Protocol (FPRP) for Mobile Ad Hoc Networks" pp. 1–18 Center for Satellite and hybrid Communication Networks at http://www.lsr.umd.edu/CSHCN/.

Win et al, ATM–based TH SSMA network for multimedia PCS, IEEE Journal on Selected Areas in Communications, May 1999.

Kardach, Bluetooth Archetecture Review, Intel Technology Journal, Q2, 2000.

Wireless LAN Medium Access Control (MAC) and Physical Layer (PHY) Specifications LAN MAN Standards Committe of IEEE Computer Society, IEEE Std. 802.11, Jun. 26, 1997.

Broadband Radio Access Networks (BRAN) HIPERLAN Type 2, ETSI TR 101 683 V1.1.1., and Broadband Radio Access Networks (BRAN) HIPERLAN Type 2, Physical (PHY) Layer, ETSI TR 101 475 V1.1.1.

Federal Communications Commission Regulations § 15.247 "Operation with the bands 902–928 MHz, 2400–2483.5 MHz, and 5725–5850 MHz".

* cited by examiner

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1–3 are cancelled.

Claims 4–8 were not reexamined.

* * * * *